US012589310B2

(12) United States Patent
Black et al.

(10) Patent No.: US 12,589,310 B2
(45) Date of Patent: Mar. 31, 2026

(54) SYSTEMS AND METHODS FOR ARTIFICIAL INTELLIGENCE (AI)-ASSISTED COMMUNICATION WITHIN VIDEO GAME

(71) Applicant: Sony Interactive Entertainment Inc., Tokyo (JP)

(72) Inventors: Glenn Black, San Mateo, CA (US); Jeffrey Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 435 days.

(21) Appl. No.: 18/309,833

(22) Filed: May 1, 2023

(65) Prior Publication Data

US 2024/0367055 A1      Nov. 7, 2024

(51) Int. Cl.
| *A63F 13/00* | (2014.01) |
| *A63F 13/67* | (2014.01) |
| *A63F 13/87* | (2014.01) |

(52) U.S. Cl.
CPC .............. *A63F 13/67* (2014.09); *A63F 13/87* (2014.09)

(58) Field of Classification Search
CPC .......... A63F 13/67; A63F 13/79; A63F 13/87; A63F 13/422; A63F 13/428; A63F 13/45
See application file for complete search history.

(56) References Cited

U.S. PATENT DOCUMENTS

| 7,785,197 B2 | 8/2010 | Smith |
| 8,523,673 B1 | 9/2013 | Boyd et al. |
| 8,751,215 B2 | 6/2014 | Tardif |
| 9,684,430 B1 | 6/2017 | Perigault |

(Continued)

FOREIGN PATENT DOCUMENTS

| CN | 106943740 A | 7/2017 |
| CN | 113557069 A | 10/2021 |

(Continued)

OTHER PUBLICATIONS

Extended European Search Report in European Appln. No. 24173343. 5, mailed on Oct. 17, 2024, 10 pages.

(Continued)

*Primary Examiner* — David L Lewis
*Assistant Examiner* — Eric M Thomas
(74) *Attorney, Agent, or Firm* — Fish & Richardson P.C.

(57)      ABSTRACT

Input data is received that includes a message for communication to a target player of a video game. A portion of the input data defining the message is automatically identified using a first artificial intelligence model component. A meaning of the message defined by the portion of the input data is automatically determined using a second artificial intelligence model component. A third artificial intelligence model component is used to automatically determine, based on the meaning of the message, whether or not the message is relevant to a current game state and game context of the target player. A communication to the target player that conveys the meaning of the message is automatically composed through use of a fourth artificial intelligence model component, when the message is determined to be relevant to the current game state and game context of the target player. The communication is delivered to the target player.

28 Claims, 4 Drawing Sheets

(56)                References Cited

U.S. PATENT DOCUMENTS

| | | | |
|---|---|---|---|
| 10,179,291 | B2 | 1/2019 | Thomas et al. |
| 10,607,134 | B1 * | 3/2020 | Cosic ..................... G06N 3/084 |
| 10,915,178 | B2 | 2/2021 | Iwanami |
| 10,946,280 | B2 | 3/2021 | Kunieda |
| 11,126,266 | B1 | 9/2021 | Xiao et al. |
| 11,369,884 | B2 | 6/2022 | Niwa et al. |
| 11,402,917 | B2 | 8/2022 | Yokokawa |
| 12,131,586 | B2 | 10/2024 | Carlock et al. |
| 2002/0178011 | A1 | 11/2002 | Yotoriyama et al. |
| 2007/0191097 | A1 | 8/2007 | Johnson |
| 2009/0217211 | A1 | 8/2009 | Hildreth et al. |
| 2010/0112530 | A1 | 5/2010 | Schoenbach |
| 2010/0199228 | A1 | 8/2010 | Latta et al. |
| 2011/0059801 | A1 | 3/2011 | Shigi et al. |
| 2011/0301934 | A1 | 12/2011 | Tardif |
| 2012/0054646 | A1 | 3/2012 | Hoomani et al. |
| 2013/0084978 | A1 | 4/2013 | Olomskiy |
| 2014/0046661 | A1 | 2/2014 | Bruner |
| 2014/0329208 | A1 | 11/2014 | Jones et al. |
| 2016/0005336 | A1 | 1/2016 | Peng et al. |
| 2016/0042228 | A1 | 2/2016 | Opalka et al. |
| 2016/0059120 | A1 | 3/2016 | Komorous-King et al. |
| 2017/0173455 | A1 | 6/2017 | Sheil et al. |
| 2018/0075659 | A1 | 3/2018 | Browy et al. |
| 2018/0161683 | A1 | 6/2018 | Thomas et al. |
| 2018/0260577 | A1 | 9/2018 | Adams et al. |
| 2018/0345128 | A1 | 12/2018 | Ahmed et al. |
| 2019/0038964 | A1 | 2/2019 | Veeramani et al. |
| 2019/0171716 | A1 | 6/2019 | Weber |
| 2019/0251344 | A1 | 8/2019 | Menefee et al. |
| 2019/0340426 | A1 | 11/2019 | Rangarajan et al. |
| 2019/0391662 | A1 | 12/2019 | Yokokawa |
| 2020/0193714 | A1 | 6/2020 | Browy et al. |
| 2020/0258099 | A1 * | 8/2020 | Alghamdi .......... G06Q 30/0261 |
| 2020/0276497 | A1 | 9/2020 | Nietfeld et al. |
| 2020/0298131 | A1 | 9/2020 | Pinto et al. |
| 2020/0380793 | A1 | 12/2020 | Browy et al. |
| 2021/0146255 | A1 | 5/2021 | Taylor et al. |
| 2021/0390289 | A1 | 12/2021 | Yang et al. |
| 2022/0096937 | A1 | 3/2022 | Dorn et al. |
| 2022/0165013 | A1 | 5/2022 | Velez et al. |
| 2022/0171960 | A1 | 6/2022 | Nelson et al. |
| 2022/0188538 | A1 | 6/2022 | Vieira et al. |
| 2022/0327309 | A1 | 10/2022 | Carlock et al. |
| 2022/0343576 | A1 | 10/2022 | Marey et al. |
| 2022/0362680 | A1 | 11/2022 | Stafford et al. |
| 2023/0087879 | A1 | 3/2023 | An et al. |
| 2024/0335737 | A1 | 10/2024 | Bean et al. |
| 2024/0335740 | A1 | 10/2024 | Bean et al. |
| 2024/0367034 | A1 | 11/2024 | Tokubo et al. |
| 2024/0375011 | A1 | 11/2024 | Black et al. |

FOREIGN PATENT DOCUMENTS

| | | | |
|---|---|---|---|
| EP | 3979050 | A1 | 4/2022 |
| JP | 2011-212296 | A | 10/2011 |
| JP | 2013-135761 | A | 7/2013 |
| JP | 2020-031903 | A | 3/2020 |
| JP | 2020-065656 | A | 4/2020 |
| JP | 2020-513960 | A | 5/2020 |
| JP | 2020-177438 | A | 10/2020 |
| JP | 2022-522402 | A | 4/2022 |
| KR | 102304608 | B1 | 9/2021 |
| WO | WO 2017081896 | A1 | 5/2017 |
| WO | WO 2020176106 | A1 | 9/2020 |

OTHER PUBLICATIONS

Uzma et al., "Advances in machine translation for sign language: approaches, limitations, and challenges, " Neural Computing, London, May 18, 2021, 33(21):1-43.

wikipedia.org [online], "Emote," Jan. 11, 2023, retrieved on Mar. 19, 2025, retrieved from URL< https://en.wikipedia.Org/w/index. php?title=Emote&oldid=1132929070>, 2 pages.

* cited by examiner

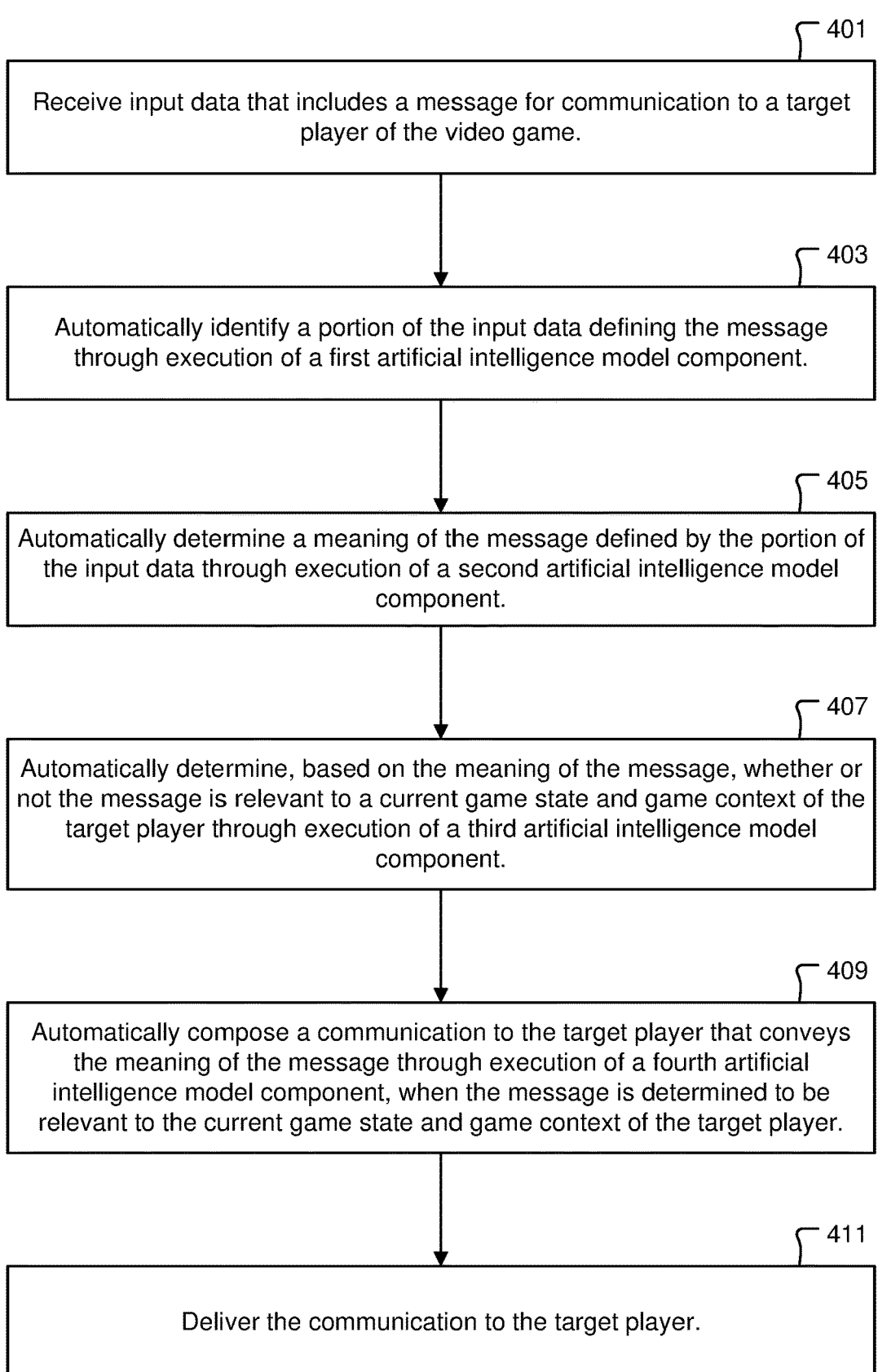

401

Receive input data that includes a message for communication to a target player of the video game.

403

Automatically identify a portion of the input data defining the message through execution of a first artificial intelligence model component.

405

Automatically determine a meaning of the message defined by the portion of the input data through execution of a second artificial intelligence model component.

407

Automatically determine, based on the meaning of the message, whether or not the message is relevant to a current game state and game context of the target player through execution of a third artificial intelligence model component.

409

Automatically compose a communication to the target player that conveys the meaning of the message through execution of a fourth artificial intelligence model component, when the message is determined to be relevant to the current game state and game context of the target player.

411

Deliver the communication to the target player.

Fig. 4

SYSTEMS AND METHODS FOR ARTIFICIAL INTELLIGENCE (AI)-ASSISTED COMMUNICATION WITHIN VIDEO GAME

BACKGROUND OF THE INVENTION

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Therefore, video game developers and providers continue to seek improvements in video game operations, particularly with regard to how messages are communicated between players of the video game in order to provide for increased player engagement and enhanced player experience. It is within this context that implementations of the present disclosure arise.

SUMMARY OF THE INVENTION

A system is disclosed for artificial intelligence (AI)-assisted communication within a video game. The system includes an input processor configured to receive input data that includes a message for communication to a target player of the video game. The system also includes a message identification engine having a first AI model component configured and trained to automatically process the input data to identify a portion of the input data defining the message. The system also includes a message interpretation engine having a second AI model component configured and trained to automatically determine a meaning of the message defined by the portion of the input data as identified by the message identification engine. The system also includes a message relevancy assessment engine having a third AI model component configured and trained to automatically determine whether or not the message is relevant to a current game state of the target player and a current game context of the target player based on the meaning of the message as determined by the message interpretation engine. The system also includes a communication conveyance engine having a fourth AI model component configured and trained to automatically compose a communication to the target player that conveys the meaning of the message, as determined by the message interpretation engine, when the message is determined to be relevant by the message relevancy assessment engine. The system also includes an output processor configured to deliver the communication as composed by the communication conveyance engine to the target player.

A method is disclosed for AI-assisted communication within a video game. The method includes receiving input data that includes a message for communication to a target player of the video game. The method also includes automatically identifying a portion of the input data defining the message through execution of a first AI model component. The method also includes automatically determining a meaning of the message defined by the portion of the input data through execution of a second AI model component. The method also includes automatically determining, based on the meaning of the message, whether or not the message is relevant to a current game state and game context of the target player through execution of a third AI model component. The method also includes automatically composing a communication to the target player that conveys the meaning of the message through execution of a fourth AI model component, when the message is determined to be relevant to the current game state and game context of the target player. The method also includes delivering the communication to the target player.

BRIEF DESCRIPTION OF THE DRAWINGS

FIG. 4 shows a flowchart of a method for AI-assisted communication within a video game, in accordance with some embodiments.

DETAILED DESCRIPTION OF THE INVENTION

Figure 1:
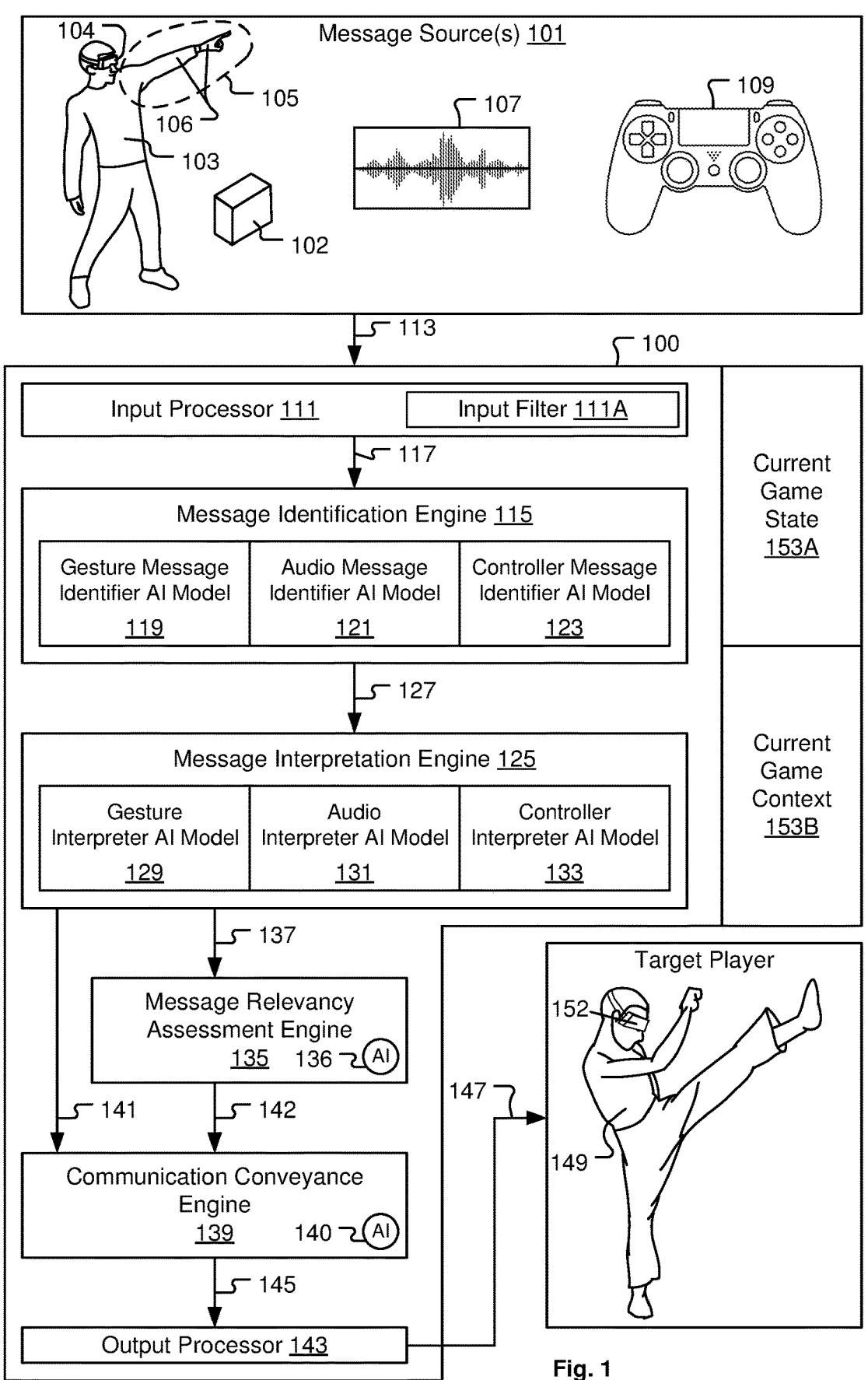
FIG. 1 shows a diagram of a system for AI-assisted communication within a video game, in accordance with some embodiments.

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Many modern computer applications, such as video games, virtual reality applications, augmented reality applications, virtual world applications, etc., provide for various forms of communication to users of the computer applications. For ease of description, the term "video game" as used herein refers to any of the above-mentioned types of computer applications that provide for user participation in the execution of the computer application. Also, for ease of description, the term "player" (as in video game player) as used herein refers to a user that participates in the execution of any of the above-mentioned types of computer applications.

In various embodiments, in-game communications are made between different players of the video game. Also, in some embodiments, in-game communications are made between spectators of the video game and players of the video game. Also, in some embodiments, communications are made between virtual entities (e.g., video game-generated entities) and players of the video game. Also, in some embodiments, communications are made between spectators and virtual entities. Also, in some embodiments, communications are made between two or more spectators of the video game. The spectators of the video game in the various embodiments can be real people and/or virtual (e.g., AI-generated) spectators. Also, in some embodiments, a virtual spectator can be instantiated on behalf of a real person. In various embodiments, communications that are conveyed to players within the video game can have one or more of a textual format, an image format, a video format, an audio format, and a haptic format, among essentially any other format that can be implemented within the video game. In various embodiments, the content of a communication made within the video game is one or more of a gesture (made either by a real human body or a virtual entity within the video game), a spoken language statement/phrase (made either audibly or in written form), and a video game controller input. In various embodiments, the video game controller can be any type of device used to convey any type of user input to a computer system executing the video game. For example, in various embodiments, the video game controller is one or more of a hand-held video game controller, a head-mounted display (HMD) device, a sensor-embedded wearable device (e.g., glove, glasses, vest, shirt, pants, cape, hat, etc.), and a wielded control device (e.g., wand, club, gun, bow and arrow, sword, knife, bat, racket, shield, etc.).

In various embodiments, communications are made to players of the video game within the context of the video game, such that the communications are conveyed in a form that is commensurate with the game state and game context of the video game. For example, if a target player of a video game is shown a heads-up display as part of their normal play of the video game, then a player-to-player communication may be conveyed as an image and/or textual message within the heads-up display of the target player. For ease of description, the term "target player" as used herein refers to the player of the video game to whom a message is directed, regardless of the source of the message. Also, for ease of description, the term "message source" as used herein refers to the entity that originated the message that is to be conveyed to the target player. In various embodiments, the message source is one or both of a human being and a virtual entity, where the human being is either playing the video game or spectating the video game, and where the virtual entity is generated as an object or an aspect of the video game. In various embodiments, the message source is one or more of a player of the video game, a spectator of the video game, a computer-generated entity (e.g., avatar, object, etc.) within the video game, among essentially any other entity that may be present within or interfaced to an environment/context of the video game, where the message source is permitted by the rules of the video game to engage in communication with the target player.

Many modern video games involve rapid changes in game state and/or game context as the video game is played, which can pose challenges for timely processing and conveyance of messages from the message source to the target player. Also, as computer processing capabilities continue to improve, many video games are moving toward use of more gesture-based input for controlling player action, interaction, and communication within the video games. In some embodiments, when the content of a message is a human gesture made by the message source, the video game system may need to identify and translate that human gesture into a verbal communication that can be conveyed to the target player. With conventional linear procedural processing techniques, the procedures for identifying and translating the gesture, and ultimately conveying the verbal communication to the target player can take a significant amount of time relative to a rate at which the game state and/or game context is changing during execution of the video game, such that when the verbal communication is received by the target player, the verbal communication may no longer be relevant to the current game state and/or game context associated with the target player, which could lead to confusion and/or aggravation of the target player, and possibly adversely affect the target player's playing of the video game. For example, if a target player were moving through a labyrinth in a video game where a first upcoming right turn leads to the exit, but a second upcoming right turn leads to a bottomless pit, processing of a gestured message from a message source into a verbal communication to the target player to take the next right turn could lead to the target player falling into the bottomless pit if there is too much latency/delay in processing of gestured message and generation/conveyance of the corresponding verbal communication to the target player. Therefore, because of latency/delay in message processing (particularly in gesture-based message processing) a message that may have been originally well-intended for the benefit of the target player may actually end up adversely affecting the target player.

Timely communication is an ongoing challenge in the context of real-time video game development. Some of the reasons for communication delay within the real-time video game play context include the slowness of message sources in giving the message, the latency in the system's processing of the message and conveying the corresponding communication to the target player, and the type of message that is being processed. In particular, gesture-based messages require significant computer processing for interpretation and translation into a communication format that is conveyable to the target player. In the video game context, the gesture-based message can be any type of message that is conveyed through positioning and movement of one or more real human body parts of a person engaged with the video game and/or through positioning and movement of one or more visual parts of a virtual entity within the video game context. In various embodiments, a gesture-based message can take the form of essentially any pose and/or movement of one or more body parts (or virtual entity parts) that is meaningful within the context of the video game. Also, in some embodiments, a gesture-based message can take the form of formal/standardized sign language, such as American Sign Language.

Depending on the complexity of the gestured message, the video game system may not determine the meaning of the gestured message and/or formulate corresponding words for the gestured message rapidly enough for the message to make sense to the target player, or a third party, or the video game system itself. In various embodiments disclosed herein, if the video game system determines that the gestured message will not make sense at the current point in the video game, based on the current game state and game context, the processing of the gestured message can be stopped so that the corresponding communication to the target player is not sent. For example, if the gestured message was to alert the target player to the presence of a bear in the woods, and the target player had already seen the bear, the video game system will stop the processing of the gestured message and not send the communication to the target player. In some embodiments, the video game system operates to notify the message source when their gestured message is not sent to the target player for some reason. For example, the message source that gestured for the target player to watch out for the bear in the woods may be informed by the video game system that the target player had already seen the bear.

In some embodiments, if a particular gestured message is not sent due to latency (or anticipated latency), the meaning of that particular gestured message can be examined by the video game system to determine if some other corresponding substitute communication can be sent in a timely manner to the target player instead. For example, in the above-mentioned bear in the woods example, the video game system may generate and send a substitute communication to the target player informing them that they are now positioned between the bear and her cubs. In this manner, the message source will be involved in the video game and not feel excluded.

Also, in some embodiments, if the message source is trying to send a message that is too complex, the video game system can automatically reduce or summarize the complex message into a simpler message for communication to the target player. For example, if the message source gestures the following message for the target player: "I see a bear, it is hidden behind the tree, so you better watch out," latency in the processing of the gestured message may cause the ultimate communication of the message to the target player to arrive too late to be helpful. If it is determined/predicated by the video game system that latency in processing of the gestured communication is a problem, the video game system can automatically generate a summary or truncated communication to convey the intent of the original message provided by the message source. For example, with reference to the above-mentioned example message concerning the bear hidden behind the tree, the video game system can operate to automatically generate a truncated statement, such as "bear behind tree," which can be communicated to the target player in a more timely manner.

FIG. 1 shows a diagram of a system 100 for artificial intelligence (AI)-assisted communication within a video game, in accordance with some embodiments. The system 100 includes an input processor 111 that is configured to receive input data from one or more message source(s) 101, as indicated by arrow 113. The input data includes a message for communication to a target player 149 of the video game. In various embodiments, the one or more message source(s) 101 includes a human person 103, an audio clip 107, and a game controller 109. In some embodiments, the audio clip 107 is generated by the human person 103. In some embodiments, the audio clip 107 is provided by an entity other than the human person 103, such as by a virtual entity within the video game. The game controller 109 can be any type of game controller, including, but not limited to, one or more of a hand-held video game controller, an HMD device, a sensor-embedded wearable device, and a wielded control device. In some embodiments, the human person 103 is co-player of the target player 149 within the video game, where the message is directed from the message source(s) 101 to the target player 149. In some embodiments, the human person 103 is a spectator of the video game that is being played by the target player 149 to whom the message is directed by the message source(s) 101. In some embodiments, the human person 103 uses equipment that enables the human person 103 to interface with and engage with the video game. For example, in FIG. 1, the human person 103 is shown to be using an HMD 104 and a camera 102. The HMD 104 allows the human person 103 to engage with the video game in an immersive manner. The camera 102 provides for capturing of images/video that include gesture-based messages provided by the human person 103. For example, the human person 103 is shown to be making a gesture 105 with their left arm and hand 106 that is intended to be interpreted as a message directed to the target player 149. Again, it should be understood that essentially any type of gesture can be made by the human person 103, so long as the gesture can be interpreted by the system 100 as having meaning within the context of the video game. In some embodiments, the input processor 111 includes an input filter 111A that is configured to implement a filtering process to remove parts of the input data received from one or more message source(s) 101 that are not relevant to a message that is to be communicated to the target player 149, thereby beneficially isolating message-related input data. In some embodiments, the input data received from one or more message source(s) 101 includes a video of the human person 103 making a gesture, where the message for communication to the target player 149 is provided at least in part by the gesture. In some embodiments, the portion of the input data defining the message is identified as a pixel region within each of a number of video frames of the video of the human person 103 making the gesture. In some embodiments, in addition to the video of the human person 103 making the gesture, the input data received from one or more message source(s) 101 also includes one or more of the audio clip 107 and input signals from the video game controller 109, where the message for communication to the target player 149 is provided at least in part by one or more of the audio clip 107 and the input signals from the video game controller 109.

It should also be understood that the system 100 has real-time access to the current game state 153A and game context 153B of the video game being played by the target player 149. In some embodiments, the game state 153A defines the state of game play of a particular player of a video game at a particular point in time. In some embodiments, the game state 153A includes user/player saved data that includes information that personalizes the video game for the corresponding player. For example, the game state 153A can include information associated with the user's character, so that the video game is rendered with a character that may be unique to that user, such as with regard to shape, look, clothing, weaponry, etc. Also, the game context 153B is essentially any and all data that defines a scene within which a player of the video game is present and/or to which a player of the video game is associated. In some embodiments, the game context 153B also includes a history of play of the video game by the particular player of the video game. In some embodiments, the game context 153B also includes information about one or more other scenes of the video game to which the particular player of the video game may transition, depending on actions/decisions performed by various entities within the video game.

The system 100 also includes a message identification engine 115 that receives the message-related input data from the input processor 111, as indicated by arrow 117. The message identification engine 115 is configured to process the message-related input data to identify a portion of the message-related input data that defines the message that is to be communicated to the target player 149. In some embodiments, the message identification engine 115 includes a gesture message identifier AI model component 119 that is configured and trained to automatically identify a portion of image/video data that includes a gesture made by the human person 103, where the gesture is conveying a message to the target player 149. Also, in some embodiments, the message identification engine 115 includes an audio message identifier AI model component 121 that is configured and trained to automatically identify a portion of an audio clip that includes a message to the target player 149 or that augments a gesture-based message to the target player 149. Also, in some embodiments, the message identification engine 115 includes a controller message identifier AI model component 123 that is configured and trained to automatically identify a controller input signal that includes a message to the target player 149 or that augments a gesture-based message to the target player 149. In this manner, within the overall system 100, the message identification engine 115 includes at least a first AI model component (one or more of 119, 121, and 123) configured and trained to process the input data received from the message source(s) 101 to automatically identify a portion of the input data that defines the message to the target player 149.

The system also includes a message interpretation engine 125 that receives the portion of the input data that defines the message to the target player 149 as determined by the message identification engine 115, as indicated by arrow 127. The message interpretation engine 125 is configured to process the portion of the input data that defines the message to the target player 149 to determine a meaning of the message to the target player 149. In some embodiments, the message interpretation engine 125 includes a gesture interpreter AI model component 129 that is configured and trained to automatically determine the meaning of a gesture within the message to the target player 149. In some embodiments, the gesture interpreter AI model component 129 is configured and trained to determine the meaning of the gestured message through identification of a body part used to make the gesture and through identification of a positioning of the body part and/or a manner of movement of the body part. In some embodiments, this gesture interpreter AI model component 129 is configured and trained to determine the meaning of the message to the target player 149 before the human person 103 finishes making the gesture, thereby providing for acceleration of the message conveyance to the target player 149.

Also, in some embodiments, the message interpretation engine 125 includes an audio interpreter AI model component 131 that is configured and trained to automatically determine the meaning of an audio clip associated with the message to the target player 149. Also, in some embodiments, the message interpretation engine 125 includes a controller interpreter AI model component 133 that is configured and trained to automatically determine the meaning of a controller input signal associated with the message to the target player 149. In this manner, within the overall system 100, the message interpretation engine 125 includes at least a second AI model component (one or more of 129, 131, and 133) configured and trained to automatically process the portion of the input data that defines the message to the target player 149 (as determined by the message identification engine 115) to automatically determine a meaning of the message to the target player 149.

In some embodiments, the message interpretation engine 125 is used to implement a message autocomplete process. In some embodiments, based on the current game state 153A and game context 153B, a probabilistic determination can be made as to what message the message source 101 is attempting to provide before the message source 101 actually finished providing the message. When the probability of a given message being provided reaches a certain threshold value, the message interpretation engine 125 can automatically determine that the given message is being provided even though the message source 101 has not yet finished providing the message. This autocomplete process is particularly effective with regard to interpreting gestured messages. In various embodiments, the message interpretation engine 125 can use many different input types, signals, and data to narrow down the possible options for the message that is being provided by the message source 101. For example, gaze direction, emotion detection, and/or any other input parameter associated with the message source 101 can be used to intuit the intent of the message that is being provided by the message source 101. In some embodiments, different gesture interpreter AI model components 129 can be built for different message sources 101 to facilitate the probabilistic determination that underlies the message autocomplete process.

In some embodiments, a record of the message communications made during play of the video game along with the corresponding game state and game context data can be analyzed together offline, e.g., after game play, to build and train the AI models 129, 131, and 133 that enable prediction of message communications for/within particular game states and/or game contexts. Then, when the video game is played, the AI models 129, 131, and 133 can be used to make predictive determinations regarding message communication intent and message interpretation in order to speed up message communications during play of the video game. In some embodiments, the audio interpreter AI model component 131 can learn keywords and responses to help with the accuracy and speed of determining the intent and interpretation of message communications. For example, when the system 100 hears the keyword "glitch" from the target player 149, the system 100 can use the keyword "glitch" as a type of negative feedback to learn that the message interpretation and/or delivery was flawed in some way. Post-game analysis of communications made by one or more message source(s) 101 to one or more target player(s) 149 can be used to train the AI models 129, 131, and 133 in making predictive interpretations of messages. This type of AI model training can be done across a spectrum of video games played by the message source(s) 101 to learn habits and modes of message communication.

The system 100 also includes a message relevancy assessment engine 135 that receives the meaning of the message to the target player 149 as determined by the message interpretation engine 125, as indicated by arrow 137. The message relevancy assessment engine 135 is configured to automatically determine whether or not the message that is intended for the target player 149 is relevant to the current game state 153A of the target player 149 and the current game context 153B of the target player 149 based on the meaning of the message as determined by the message interpretation engine 125. In this manner, the system 100 is configured to ensure that messages from one or more message sources(s) 101 are meaningfully related to the current game state 153A and the current game context 153B before the messages are communicated to the target player 149. In some embodiments, the message relevancy assessment engine 135 includes an AI model component 136 configured and trained to assess the relevancy of the message to the target player 149, given the current game state 153A and game context 153B of the video game. In some embodiments, the AI model component 136 is configured to determine a scope of the current game context 153B based on whether the message is intended to be an individual-to-individual communication or whether the message is intended to be broadcast to multiple persons, where the established scope of the current game context 153B encompasses all of the target recipients of the message. The message relevancy engine 135 continuously analyzes the current game state 153A and game context 153B associated with the target player 149 of the message to determine whether or not conveyance of the message to the target player 149 is appropriate, timely, and/or beneficial to the target player 149. In this manner, by way of the message relevancy assessment engine 135, the system 100 uses its awareness of what is currently (in real-time) going on with the target player 149 to determine whether or not to convey the message to the target player 149.

In some embodiments, the AI model component 136 is configured and trained based on a large population of message relevancy outcomes for many different messages conveyed in various game states and game contexts. In some embodiments, if the message relevancy assessment engine 135 determines that the message is not sufficiently relevant to the current game state 153A of the target player 149 and/or the current game context 153B of the target player 149, the message relevancy assessment engine 135 can direct that no further processing of the message be performed by the system 100. In this manner, within the overall system 100, the message relevancy assessment engine 135 includes a third AI model component (136) configured and trained to automatically determine whether or not the message is relevant to the current game state 153A of the target player 149 and the current game context 153B of the target player 149 based on the meaning of the message as determined by the message interpretation engine 125.

In some embodiments, the AI model component 136 of the message relevancy assessment engine 135 is configured and trained to evaluate the meaning of the message to the target player 149 to identify a subject of the message and an action associated with the subject of the message. In these embodiments, the AI model component 136 of the message relevancy assessment engine 135 is configured and trained to deem the message to the target player 149 relevant when it is determined that the subject of the message is still present within the current game context 153B of the target player 149 and the action associated with the subject of the message is still pertinent to the current game state 153A of the target player 149. In some embodiments, the AI model component 136 of the message relevancy assessment engine 135 is configured and trained to cancel further processing of the message to the target player 149 by the system 100 when it is determined that the subject of the message is no longer present within the current game context 153B of the target player 149 or the action associated with the subject of the message is no longer pertinent to the current game state 153A of the target player 149. Also, in some embodiments, the AI model component 136 of the message relevancy assessment engine 135 is configured and trained to cancel further processing of the message to the target player 149 by the system 100 when it is determined that the action associated with the subject of the message is not beneficial for improving the current game state 153A of the target player 149. Also, in some embodiments, the AI model component 136 of the message relevancy assessment engine 135 is configured and trained to cancel further processing of the message to the target player 149 by the system 100 when it is determined that the subject of the message and the action associated with the subject of the message are redundant with another communication already conveyed to the target player 149.

The system 100 also includes a communication conveyance engine 139 that receives both the meaning of the message to the target player 149 as determined by the message interpretation engine 125, as indicated by arrow 141, and the relevancy determination for the message to the target player 149 as determined by the message relevancy assessment engine 135, as indicated by arrow 142. The communication conveyance engine 139 is configured to automatically compose a communication to the target player 149 that conveys the meaning of the message to the target player 149 as determined by the message interpretation engine 125, when the message to the target player 149 is determined to be relevant by the message relevancy assessment engine 135. In some embodiments, the communication conveyance engine 139 includes an AI model component 140 configured and trained to compose the communication to the target player 149 based on the current game state 153A and current game context 153B of the target player 149, so as to provide the communication in an optimized manner that is commensurate with a level of urgency and importance of the message to the target player 149. It should be understood that the communication conveyance engine 139 determines the format and content of the communication that is conveyed to the target player 149. For example, if the target player 149 is using an HMD 152, then the communication conveyance engine 139 will compose the communication for conveyance through the HMD 152. In various embodiments, the format of the communication composed by the communication conveyance engine 139 is one or more of an image, a video, a textual message, an audio clip, and a haptic action, among essentially any other possible communication format applicable to the video game being played. In some embodiments, the AI model component 140 of the communication conveyance engine 139 is configured and trained to automatically determine a format for the communication to the target player 149, where the format is one or more of a textual format, an audible format, a graphical format, and a haptic format. Also, the communication conveyance engine 139 determines a degree to which the message to the target player 149 is to be abbreviated in the communication that is ultimately conveyed to the target player 149. In this manner, within the overall system 100, the communication conveyance engine 139 includes a fourth AI model component (140) configured and trained to automatically compose a communication to the target player 149 that conveys the meaning of the message as determined by the message interpretation engine 125, when the message is determined to be relevant by the message relevancy assessment engine 135.

In some embodiments, the AI model component 140 of the communication conveyance engine 139 is configured and trained to automatically compose a consolidated communication to the target player 149 that conveys a similar meaning of multiple messages as determined by the message interpretation engine 125 in lieu of automatically composing multiple, separate communications to the target player 149 for the multiple messages, respectively. For example, in a video game that involves group play of multiple players, if several of the players are attempting to simultaneously communicate the same or similar information to the target player 149, the AI model component 140 of the communication conveyance engine 139 detects that situation and responds by generating a single, timely, concise communication to the target player 149 in place of the multiple redundant communications from the several players. In some embodiments, the AI model component 140 of the communication conveyance engine 139 is configured and trained to automatically recognize a higher urgency level for conveying the communication to the target player 149. In some of these embodiments, the AI model component 140 of the communication conveyance engine 139 is configured and trained to automatically compose an abbreviated communication to the target player 149 that conveys a shorter version of the message in response to recognizing the higher urgency level for conveying the communication to the target player 149.

By way of the communication conveyance engine 139, the system 100 uses its awareness of what is currently (in real-time) going on with the target player 149 to determine how to best convey the message to the target player 149, e.g., to determine what content and format the communication to the target player 149 should have in order to best convey the message for the benefit of the target player 149. In some embodiments, the communication conveyance engine 139 operates to visually highlight certain elements within the current game context 153B of the target player 149 in order to convey one or more nuances of the message in an efficient and effective manner. Through use of both the message relevancy assessment engine 135 and the communication conveyance engine 139, the system 100 operates to process and convey messages based on the current game state 153A and game context 153B associated with the target player 149, such that just relevant, timely, concise, and beneficial communications are conveyed to the target player 149.

The system also includes an output processor 143 configured to receive the communication as composed by the communication conveyance engine 139, as indicated by arrow 145, and deliver the communication as composed by the communication conveyance engine 139 to the target player 149, as indicate by arrow 147. In some embodiments, the output processor 143 is defined to prepare and transmit the communication to the target player 149 within data packets over a network, such as one or more of a local area network (wired and/or wireless and/or optical), a wide area network (wired and/or wireless and/or optical), a cellular network, a satellite network, and the Internet, among essentially any other type of network over which data signals can be transmitted. In these embodiments, the data packets are prepared by the output processor 143 in accordance with any known and available network communication protocol. In some embodiments, the output processor 143 includes a network interface card (NIC) to provide for packetization of outgoing data to be transmitted from the system 100 to the target player 149.

It should be understood that the system 100 configuration depicted in FIG. 1 is one example of various ways in which the system 100 for AI-assisted communication within the video game can be configured to implement the various operations and methods disclosed herein. For example, in alternative embodiments, two or more of the message identification engine 115, the message interpretation engine 125, the message relevancy assessment engine 135, and the communication conveyance engine 139 are implemented together in a combined AI model. Also, in some embodiments, the message relevancy engine 135 is either omitted or turned off, such that all messages are deemed relevant by default. Also, in some embodiments, the incoming data to the input processor 111 includes metadata that identifies the message portion of the input data. In these embodiments, the message identification engine 115 is bypassed, such that the message portion of the input data as identified through accompanying metadata is provided directly from the input processor 111 to the message interpretation engine 125. Also, in some embodiments, the system 100 is implemented as an accessibility option, such that the system 100 can be enabled and disabled by the message source 101 and/or the target player 149.

Figure 2:
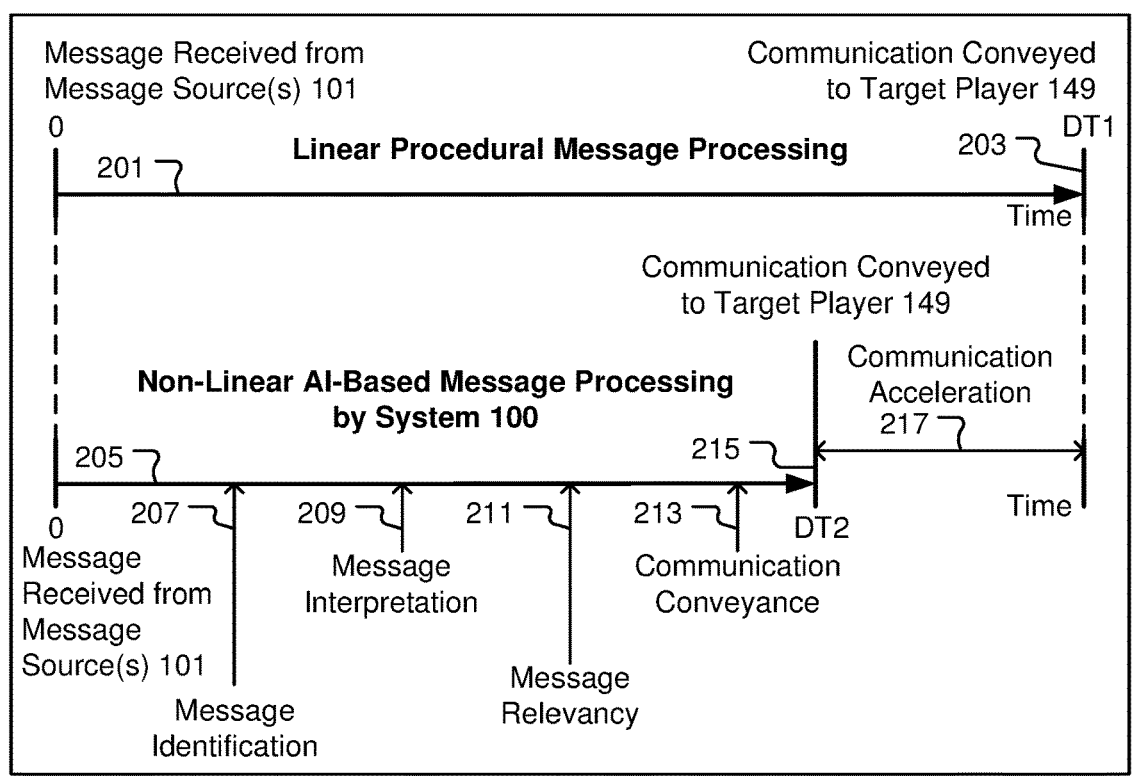
FIG. 2 shows a chart that illustrates the acceleration in message communication afforded by the system of FIG. 1, in accordance with some embodiments.

FIG. 2 shows a chart that illustrates the acceleration in message communication afforded by the system 100 of FIG. 1, in accordance with some embodiments. It should be understood that by leveraging AI within the system 100, it is possible to process and convey messages to the target player 149 in a more rapid and optimized manner that what is possible through linear procedural (non-AI) processing of the messages to the target player 149. FIG. 2 shows a first duration of time 201 required to deliver a given message using linear procedural (non-AI) processing of the given message. The first duration of time 201 extends from a time zero (0) to a first delivery time (DT1) 203. FIG. 2 also shows a second duration of time 205 required to deliver the given message using the AI-based system 100. The second duration of time 205 extends from a time zero (0) to a second delivery time (DT2) 215. FIG. 2 shows that the system 100 provides for accelerated processing and delivery of the message to the target player 149 by an amount of time 217. FIG. 2 also shows various points in the non-linear AI-based processing of the given message by the system 100. For example, the given message is identified by the message identification engine 115 at a time indicated by arrow 207. Then, the given message is interpreted by the message interpretation engine 125 at a time indicated by arrow 209. Then, the relevancy of the given message is determined by the message relevancy assessment engine 135 at a time indicated by arrow 211. Then, the communication to the target player 149 for the given message is composed by the communication conveyance engine 139 at a time indicated by arrow 213. Then, the communication is ultimately conveyed to the target player 149 at the second delivery time (DT2) 215.

As shown in FIG. 2, the system 100 provides for faster message communication from the message source 101 to the target player 149. In some embodiments, faster message communication is provided, at least in part, through faster AI-based identification of the message within the input data using the message identification engine 115. Also, in some embodiments, faster message communication is provided, at least in part, through faster AI-based interpretation of the message using the message interpretation engine 125. Also, in some embodiments, faster message communication is provided, at least in part, through generation and conveyance of an abbreviated form of the message using the AI model component 140 within the communication conveyance engine 139. Also, in some embodiments, faster message communication is provided, at least in part, through determination and selection of the most rapid/efficient and effective manner of conveyance of the message using the AI model component 140 within the communication conveyance engine 139.

Figure 3:
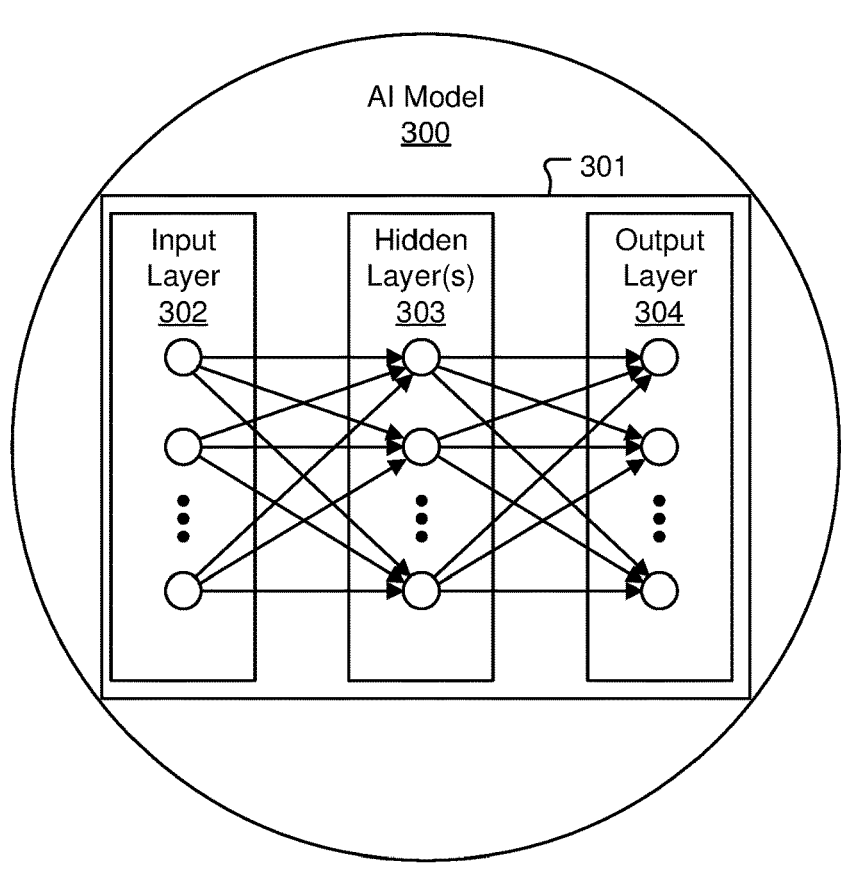
FIG. 3 shows an example AI model that implements a neural network, in accordance with some embodiments.

FIG. 3 shows an example AI model 300 that implements a neural network 301, in accordance with some embodiments. In some embodiments, the AI model 300 is representative of each of the AI model components in the system 100, including the gesture message identifier AI model component 119, the audio message identifier AI model component 121, the controller message identifier AI model component 123, the gesture interpreter AI model component 129, the audio interpreter AI model component 131, the controller interpreter AI model component 133, the AI model component 136 within the message relevancy assessment engine 135, and the AI model component 140 within the communication conveyance engine 139.

Given an input, the AI model 300 can analyze the input and provide an appropriate response to the input. For example, when the AI model 300 is trained as the gesture message identifier AI model component 119, the AI model 300 can be used to identify a gesture that conveys a message within an image and/or video frame and/or series of video frames. Also, when the AI model 300 is trained as the audio message identifier AI model component 121, the AI model 300 can be used to identify a message within an audio clip. Also, when the AI model 300 is trained as the controller message identifier AI model component 123, the AI model 300 can be used to identify a message associated with a controller input signal or with a combination of controller input signals. Also, when the AI model 300 is trained as the gesture interpreter AI model component 129, the AI model 300 can be used to determine the meaning of a message conveyed by a given gesture. Also, when the AI model 300 is trained as the audio interpreter AI model component 131, the AI model 300 can be used to determine the meaning of a message within an audio clip. Also, when the AI model 300 is trained as the controller interpreter AI model component 133, the AI model 300 can be used to determine the meaning of a message conveyed by one or more controller input signals. Also, when the AI model 300 is trained as the AI model component 136 within the message relevancy assessment engine 135, the AI model 300 can be used to determine the relevance of the message to the current game state 153A and the current game context 153B. Also, when the AI model 300 is trained as the AI model component 140 within the communication conveyance engine 139, the AI model 300 can be used to compose the communication to the target player 149 to convey the message in the most appropriate and efficient manner.

In some embodiments, the message identification engine 115 includes one or more modelers configured to build each of the gesture message identifier AI model component 119, the audio message identifier AI model component 121, and the controller message identifier AI model component 123, as needed to learn about the message identification process for a given game state 153A and game context 153B. In some embodiments, the message interpretation engine 125 includes one or more modelers configured to build each of the gesture interpreter AI model component 129, the audio interpreter AI model component 131, and the controller interpreter AI model component 133, as needed to learn about the message interpretation process for a given game state 153A and game context 153B. In some embodiments, the message relevancy assessment engine 135 includes a modeler configured to build the AI model component 136 as needed to learn about the message relevancy assessment process for a given game state 153A and game context 153B. In some embodiments, the communication conveyance engine 139 includes a modeler configured to build the AI model component 140 as needed to learn about the communication composition process for a given game state 153A and game context 153B. In various embodiments, the system 100 utilizes AI, including deep learning algorithms, reinforcement learning, and/or other AI-based algorithms to build and train the various AI model components 119, 121, 123, 129, 131, 133, 136, and 140. Also, in some embodiments, the system 100 is configured to continually refine the training of one or more of the various AI model components 119, 121, 123, 129, 131, 133, 136, and 140, given any updated training data.

In various embodiments, the neural network 301 can be implemented as a deep neural network, a convolutional deep neural network, and/or a recurrent neural network using supervised or unsupervised training. In some embodiments, the neural network 301 includes a deep learning network that supports reinforcement learning, or rewards based learning (e.g., through the use of success criteria, success metrics, etc.). For example, in some embodiments, the neural network 301 is set up as a Markov decision process (MDP) that supports a reinforcement learning algorithm.

The neural network 301 represents a network of interconnected nodes, such as an artificial neural network. In FIG. 3, each circle represents a node. Each node learns some information from the training data. Knowledge can be exchanged between the nodes through the interconnections. In FIG. 3, each arrow between nodes represents an interconnection. Input to the neural network 301 activates a set of nodes. In turn, this set of nodes activates other nodes, thereby propagating knowledge about the input. This activation process is repeated across other nodes until an output is provided. The example neural network 301 includes a hierarchy of nodes. At the lowest hierarchy level, an input layer 302 exists. The input layer 302 includes a set of input nodes. In some embodiments, intermediary predictions of the AI model 300 are determined through a classifier that creates labels, such as outputs, features, nodes, classifications, etc. At the highest hierarchical level, an output layer 304 exists. The output layer 304 includes a set of output nodes. Each output node represents a possible output of the AI model 300 for a given set of inputs provided to the AI model 300. In various embodiments, the results generated by the AI model 300 can be compared to pre-determined and true results, or learned changes and results, in order to refine and/or modify the parameters used by the system 100 to iteratively determine the appropriate predicted or expected responses and/or changes for a given set of inputs. The nodes in the neural network 301 learn the parameters of the trained AI model 300 that can be used to make such decisions when refining the parameters.

In some embodiments, one or more hidden layer(s) 303 exists within the neural network 301 between the input layer 302 and the output layer 304. The hidden layer(s) 303 includes "X" number of hidden layers, where "X" is an integer greater than or equal to one. Each of the hidden layer(s) 303 includes a set of hidden nodes. The input nodes of the input layer 302 are interconnected to the hidden nodes of first hidden layer 303. The hidden nodes of the last ("X$^{th}$") hidden layer 303 are interconnected to the output nodes of the output layer 304, such that the input nodes are not directly interconnected to the output nodes. If multiple hidden layers 303 exist, the input nodes of the input layer 302 are interconnected to the hidden nodes of the lowest (first) hidden layer 303. In turn, the hidden nodes of the first hidden layer 303 are interconnected to the hidden nodes of the next hidden layer 303, and so on, until the hidden nodes of the highest ("X$^{th}$") hidden layer 303 are interconnected to the output nodes of the output layer 304.

An interconnection connects two nodes in the neural network 301. The interconnections in the example neural network 301 are depicted by arrows. Each interconnection has a numerical weight that can be learned, rendering the neural network 301 adaptive to inputs and capable of learning. Generally, the hidden layer(s) 303 allow knowledge about the input nodes of the input layer 302 to be shared among all the tasks corresponding to the output nodes of the output layer 304. In this regard, in some embodiments, a transformation function $f$ is applied to the input nodes of the input layer 302 through the hidden layer(s) 303. In some cases, the transformation function $f$ is non-linear. Also, different non-linear transformation functions $f$ are available including, for instance, a rectifier function $f(x)=\max(0,x)$.

In some embodiments, the neural network 301 also uses a cost function c to find an optimal solution. The cost function c measures the deviation between the prediction that is output by the neural network 301 defined as $f(x)$, for a given input x and the ground truth or target value y (e.g., the expected result). The optimal solution represents a situation where no solution has a cost lower than the cost of the optimal solution. An example of a cost function c is the mean squared error between the prediction and the ground truth, for data where such ground truth labels are available. During the learning process, the neural network 301 can use back-propagation algorithms to employ different optimization methods to learn model parameters (e.g., learn the weights for the interconnections between nodes in the hidden layer(s) 303) that minimize the cost function c. An example of such an optimization method is stochastic gradient descent.

FIG. 4 shows a flowchart of a method for AI-assisted communication within a video game, in accordance with some embodiments. The method includes an operation 401 for receiving input data that includes a message for communication to the target player 149 of the video game. In some embodiments, the input data includes one or more of (A) a video of the person 103 making a gesture and (B) tracking metadata associated with the person 103 making the gesture, where the message for communication to the target player 149 is provided at least in part by the gesture. In some embodiments, the tracking metadata defines one or more of a pose of the person 103, a movement of the person 103, a position of a controller device, an orientation of the controller device, a movement of the controller device, a position of a wearable device worn by the person 103, an orientation of the wearable device worn by the person 103, and a movement of the wearable device worn by the person 103. In some embodiments, the tracking metadata is defined with regard to six degrees of freedom (6DOF), including three translational degrees of freedom (x, y, z) and three rotational degrees of freedom (about x-axis, about y-axis, about z-axis). In some embodiments, the input data includes both the gesture and one or more of the audio clip 107 and the video game controller 109 input, where the message for communication to the target player 149 is provided at least in part by one or more of the audio clip 107 and the video game controller 109 input. In some embodiments, the portion of the input data that defines the message is identified as a pixel region within each of a number of video frames of the video of the person 103 making the gesture, such as captured by the camera 102. The method also includes an operation 403 for automatically identifying a portion of the input data defining the message through execution of a first AI model component (e.g., one or more of 119, 121, 123).

The method also includes an operation 405 for automatically determining a meaning of the message defined by the portion of the input data through execution of a second AI model component (e.g., one or more of 129, 131, 133). In some embodiments, the method includes executing the second AI component to automatically identify a body part of the person 103 used to make the gesture and to automatically identify one or more of a positioning of the body part and a manner of movement of the body part. Also, in these embodiments, the method includes executing the second AI component to analyze the body part, the positioning of the body part, and/or the manner of movement of the body part to determine the meaning of the message. It should be understood that the body part of the person 103 used to make the gesture can be any body part (e.g., face, eyes, arms, legs, hands, feet, fingers, etc.) of the person or any combination of body parts of the person. In some embodiments, the body part(s) of the person 103 used to make the gesture include the eyes of the person. In these embodiments, the second AI component is configured to analyze a gaze direction and/or a manner of movement of one or both eyes of the person 103 to determine a meaning of a message conveyed by the eye(s) of the person 103. Also, it should be understood that in some embodiments the body part of the person 103 used to make the gesture is the face of the person. In these embodiments, the second AI component is configured to analyze a facial expression of the person 103 to determine a meaning of a message conveyed by the face of the person 103. Also, in some embodiments, the second AI model is configured and trained to process gesture information for a message that is in the form of tracking metadata corresponding to tracking of various components and/or parts associated with the person 103, e.g., controller tracking metadata (e.g., 6DOF), body limb tracking metadata, hand(s)/finger(s) tracking metadata, among essentially any other type of tracking metadata. The processing of tracking metadata by the second AI model is particularly relevant to video games that implement virtual reality and augmented reality. In some embodiments, the method includes executing the second AI model component to determine the meaning of the message before the person 103 finishes making the gesture, thereby providing for acceleration of the message processing and conveyance to the target player 149.

The method also includes an operation 407 for automatically determining, based on the meaning of the message, whether or not the message is relevant to a current game state 153A and current game context 153B of the target player 149 through execution of a third AI model component (e.g., 136). In some embodiments, the method includes executing the third AI model component to evaluate the meaning of the message to identify a subject of the message and an action associated with the subject of the message. Also, in these embodiments, the method includes executing the third AI model component to deem the message relevant when it is determined that the subject of the message is still present within the current game context 153B of the target player 149 and the action associated with the subject of the message is still pertinent to the current game state 153A of the target player 149. Also, in these embodiments, the method includes executing the third AI model component to cancel further processing of the message when it is determined that the subject of the message is no longer present within the current game context 153B of the target player 149 or the action associated with the subject of the message is no longer pertinent to the current game state 153A of the target player 149.

In some embodiments, the method includes executing the third AI model component to cancel further processing of the message when it is determined that the action associated with the subject of the message is not beneficial for improving the current game state 153A of the target player 149. Also, in some embodiments, the method includes executing the third AI model component to cancel further processing of the message when it is determined that the subject of the message and the action associated with the subject of the message are redundant with another communication already conveyed to the target player 149.

The method also includes an operation 409 for automatically composing a communication to the target player 149 that conveys the meaning of the message through execution of a fourth AI model component (e.g., 140), when the message is determined to be relevant to the current game state 153A and the current game context 153B of the target player 149. The method also includes an operation 411 for delivering the communication to the target player 149.

In some embodiments, the method includes executing the fourth AI model component to automatically compose a consolidated communication to the target player 149 that conveys a similar meaning of multiple messages, as determined by the second AI model component, in lieu of automatically composing multiple communications to the target player 149 for the multiple messages, respectively. Also, in some embodiments, the method includes executing the fourth AI model component to automatically recognize a higher urgency level for conveying the communication to the target player 149. In these embodiments, the method also includes executing the fourth AI model to automatically compose an abbreviated communication to the target player 149 that conveys a shorter version of the message in response to recognizing the higher urgency level for conveying the communication to the target player 149. Additionally, in some embodiments, the method includes executing the fourth AI model component to automatically determine a format for the communication to the target player 149, where the format is one or more of a textual format, an audible format, a graphical format, and a haptic format.

The system 100 is configured to recognize that the message source 101 is trying to communicate a message to the target player 149 (whether through gesture, spoken language, and/or controller input). As soon as the system 100 understands the intent of the message, the system 100 utilizes its knowledge of the current game state 153A and current game context 153B of the target player 149 to make an informed decision on how to process the message and convey the message to the target player 149. In this manner, the system 100 mitigates the occurrence of a misaligned communication, which occurs when a communication as received the target player 149 does not align with the intent of the message source 101. In some embodiments, the system 100 implements a continuous filtering process (by way of the message relevancy engine 135) to either allow the message to go through to the target player 149 or block the message from going through to the target player 149. It should be understood that the ability to interrupt and stop processing of messages that are either untimely or irrelevant to the target player 149 provides for savings in processor cycles and memory usage, which can improve the overall computing efficiency of the video game system. Also, in some embodiments, the system implements a message optimization process (by way of the communication conveyance engine 139) to automatically modify the content and/or format of the message before it is conveyed to the target player 149 based on what is most appropriate for the target player 149 given the current game state 153A and/or the current game context 153B of the target player 149. It should be understood that the system 100 provides for management of message communications from the message source(s) 101 to the target player 149 (or multiple target players), by at least the following: A) ensuring that messages are communicated to the target player 149 in a timely manner, B) abbreviating messages as needed to reduce latency in communication of the messages to the target player 149, C) avoiding communication of messages to the target player 149 that are not relevant or that have lost relevance to the current game state 153A and the current game context 153B of the target player 149, D) avoiding communication of messages to the target player 149 that are not beneficial to the target player 149, and E) avoiding communication of redundant messages to the target player 149.

Figure 5:
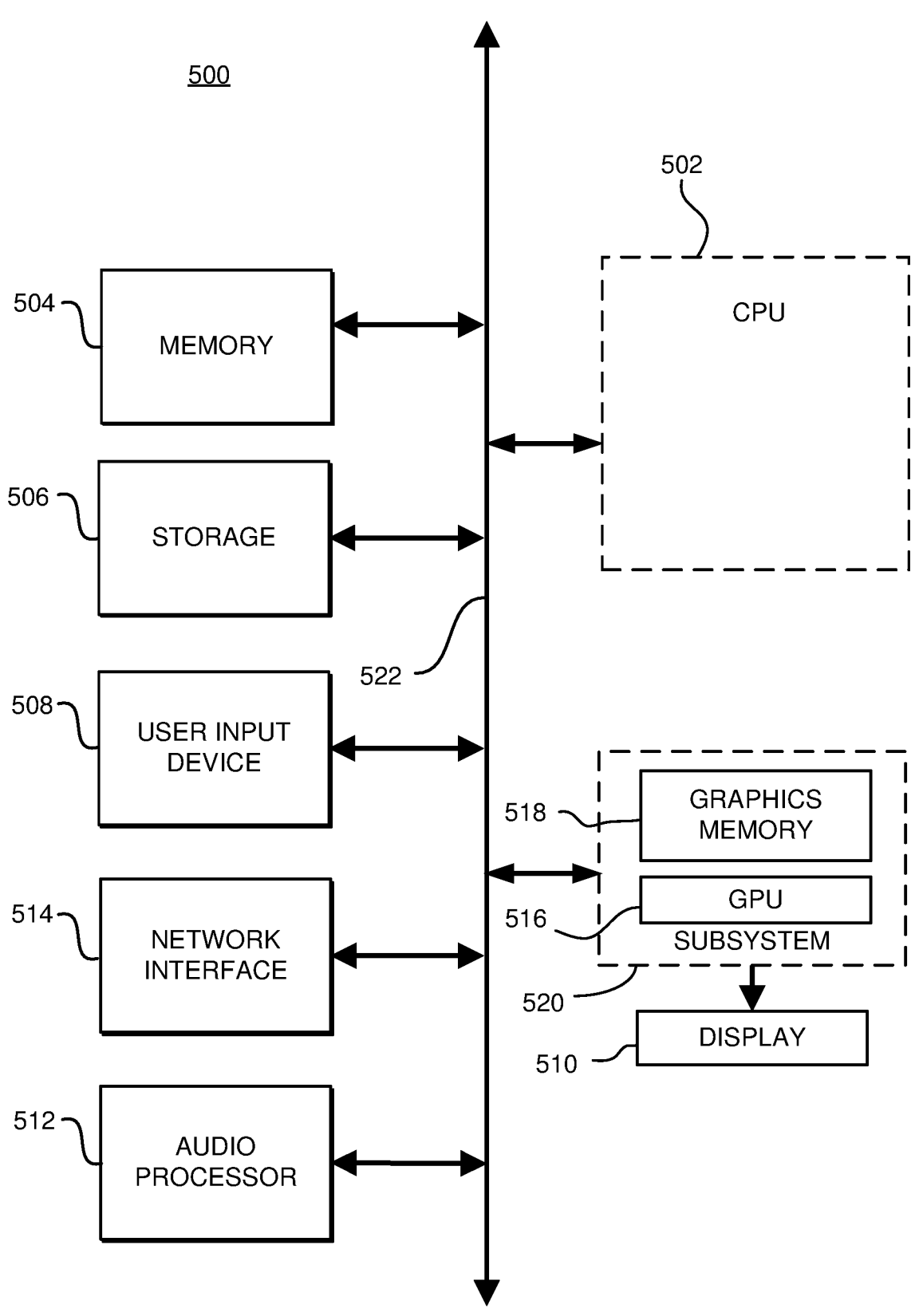
FIG. 5 shows various components of an example server device within a cloud-based computing system that can be used to perform aspects of the system of FIG. 1 and the method of FIG. 4 for AI-assisted communication within the video game, in accordance with some embodiments.

FIG. 5 shows various components of an example server device 500 within a cloud-based computing system that can be used to perform aspects of the system 100 and method for AI-assisted communication within the video game, in accordance with some embodiments. This block diagram illustrates the server device 500 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 500 includes a central processing unit (CPU) 502 for running software applications and optionally an operating system. The CPU 502 may be comprised of one or more homogeneous or heterogeneous processing cores. For example, the CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be localized to a player playing a game segment (e.g., game console), or remote from the player (e.g., back-end server processor), or one of many servers using virtualization in the cloud-based gaming system 500 for remote streaming of game play to client devices.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 514, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. In addition to display device 510, the pixel data can be projected onto a projection surface. Device 500 can provide the display device 510 with an analog or digital signal, for example.

Implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A system for artificial intelligence-assisted communication within a video game, comprising:

an input processor configured to receive input data that includes a message for communication to a target player of the video game;

a message identification engine having a first artificial intelligence model component configured and trained to automatically process the input data to identify a portion of the input data defining the message;

a message interpretation engine having a second artificial intelligence model component configured and trained to automatically determine a meaning of the message defined by the portion of the input data as identified by the message identification engine;

a message relevancy assessment engine having a third artificial intelligence model component configured and trained to automatically determine whether or not the message is relevant to a current game state of the target player and a current game context of the target player based on the meaning of the message as determined by the message interpretation engine;

a communication conveyance engine having a fourth artificial intelligence model component configured and trained to automatically compose a communication to the target player that conveys the meaning of the message as determined by the message interpretation engine when the message is determined to be relevant by the message relevancy assessment engine; and an output processor configured to deliver the communication as composed by the communication conveyance engine to the target player.

2. The system as recited in claim 1, wherein the input data includes one or more of a video of a person making a gesture and tracking metadata associated with the person making the gesture, and wherein the message for communication to the target player is provided at least in part by the gesture.

3. The system as recited in claim 2, wherein the tracking metadata defines one or more of a pose of the person, a movement of the person, a position of a controller device, an orientation of the controller device, a movement of the controller device, a position of a wearable device worn by the person, an orientation of the wearable device worn by the person, and a movement of the wearable device worn by the person.

4. The system as recited in claim 2, wherein the input data includes one or more of an audio clip and a video game controller input, and wherein the message for communication to the target player is provided at least in part by one or more of the audio clip and the video game controller input.

5. The system as recited in claim 2, wherein the portion of the input data defining the message is identified as a pixel region within each of a number of video frames of the video of the person making the gesture.

6. The system as recited in claim 2, wherein the second artificial intelligence model component is configured and trained to determine the meaning of the message through identification of a body part used to make the gesture and through identification of one or more of a positioning of the body part and a manner of movement of the body part.

7. The system as recited in claim 2, wherein the second artificial intelligence model component is configured and trained to determine the meaning of the message before the person finishes making the gesture.

8. The system as recited in claim 1, wherein the third artificial intelligence model component is configured and trained to evaluate the meaning of the message to identify a subject of the message and an action associated with the subject of the message, and wherein the third artificial intelligence model component is configured and trained to deem the message relevant when it is determined that the subject of the message is still present within the current game context of the target player and the action associated with the subject of the message is still pertinent to the current game state of the target player.

9. The system as recited in claim 8, wherein the third artificial intelligence model component is configured and trained to cancel further processing of the message by the system when it is determined that the subject of the message is no longer present within the current game context of the target player or the action associated with the subject of the message is no longer pertinent to the current game state of the target player.

10. The system as recited in claim 8, wherein the third artificial intelligence model component is configured and trained to cancel further processing of the message by the system when it is determined that the action associated with the subject of the message is not beneficial for improving the current game state of the target player.

11. The system as recited in claim 8, wherein the third artificial intelligence model component is configured and trained to cancel further processing of the message by the system when it is determined that the subject of the message and the action associated with the subject of the message are redundant with another communication already conveyed to the target player.

12. The system as recited in claim 1, wherein the fourth artificial intelligence model component is configured and trained to automatically compose a consolidated communication to the target player that conveys a similar meaning of multiple messages as determined by the message interpretation engine in lieu of automatically composing multiple communications to the target player for the multiple messages.

13. The system as recited in claim 1, wherein the fourth artificial intelligence model component is configured and trained to automatically recognize a higher urgency level for conveying the communication to the target player, and wherein the fourth artificial intelligence model component is configured and trained to automatically compose an abbreviated communication to the target player that conveys a shorter version of the message in response to recognizing the higher urgency level for conveying the communication to the target player.

14. The system as recited in claim 1, wherein the fourth artificial intelligence model component is configured and trained to automatically determine a format for the communication to the target player, wherein the format is one or more of a textual format, an audible format, a graphical format, and a haptic format.

15. A method for artificial intelligence-assisted communication within a video game, comprising:
   receiving input data that includes a message for communication to a target player of the video game;
   automatically identifying a portion of the input data defining the message through execution of a first artificial intelligence model component;
   automatically determining a meaning of the message defined by the portion of the input data through execution of a second artificial intelligence model component;
   automatically determining based on the meaning of the message whether or not the message is relevant to a current game state and game context of the target player through execution of a third artificial intelligence model component;
   automatically composing a communication to the target player that conveys the meaning of the message through execution of a fourth artificial intelligence model component when the message is determined to be relevant to the current game state and game context of the target player; and
   delivering the communication to the target player.

16. The method as recited in claim 15, wherein the input data includes one or more of a video of a person making a gesture and tracking metadata associated with the person making the gesture, and wherein the message for communication to the target player is provided at least in part by the gesture.

17. The method as recited in claim 16, wherein the tracking metadata defines one or more of a pose of the person, a movement of the person, a position of a controller device, an orientation of the controller device, a movement of the controller device, a position of a wearable device worn by the person, an orientation of the wearable device worn by the person, and a movement of the wearable device worn by the person.

18. The method as recited in claim 16, wherein the input data includes one or more of an audio clip and a video game controller input, and wherein the message for communication to the target player is provided at least in part by one or more of the audio clip and the video game controller input.

19. The method as recited in claim 16, wherein the portion of the input data defining the message is identified as a pixel region within each of a number of video frames of the video of the person making the gesture.

20. The method as recited in claim 16, further comprising:
   executing the second artificial intelligence component to automatically identify a body part used to make the gesture and to automatically identify one or more of a positioning of the body part and a manner of movement of the body part; and
   executing the second artificial intelligence component to analyze the body part, the positioning of the body part, and the manner of movement of the body part to determine the meaning of the message.

21. The method as recited in claim 16, further comprising: executing the second artificial intelligence model component to determine the meaning of the message before the person finishes making the gesture.

22. The method as recited in claim 15, further comprising: executing the third artificial intelligence model component to evaluate the meaning of the message to identify a subject of the message and an action associated with the subject of the message; and executing the third artificial intelligence model component to deem the message relevant when it is determined that the subject of the message is still present within the current game context of the target player and the action associated with the subject of the message is still pertinent to the current game state of the target player.

23. The method as recited in claim 22, further comprising: executing the third artificial intelligence model component to cancel further processing of the message when it is determined that the subject of the message is no longer present within the current game context of the target player or the action associated with the subject of the message is no longer pertinent to the current game state of the target player.

24. The method as recited in claim 22, further comprising: executing the third artificial intelligence model component to cancel further processing of the message when it is determined that the action associated with the subject of the message is not beneficial for improving the current game state of the target player.

25. The method as recited in claim 22, further comprising: executing the third artificial intelligence model component to cancel further processing of the message when it is determined that the subject of the message and the action associated with the subject of the message are redundant with another communication already conveyed to the target player.

26. The method as recited in claim 15, further comprising: executing the fourth artificial intelligence model component to automatically compose a consolidated communication to the target player that conveys a similar meaning of multiple messages as determined by the second artificial intelligence model component in lieu of automatically composing multiple communications to the target player for the multiple messages.

27. The method as recited in claim 15, further comprising: executing the fourth artificial intelligence model component to automatically recognize a higher urgency level for conveying the communication to the target player; and executing the fourth artificial intelligence model to automatically compose an abbreviated communication to the target player that conveys a shorter version of the message in response to recognizing the higher urgency level for conveying the communication to the target player.

28. The method as recited in claim 15, further comprising: executing the fourth artificial intelligence model component to automatically determine a format for the communication to the target player, wherein the format is one or more of a textual format, an audible format, a graphical format, and a haptic format.

\* \* \* \* \*